3,597,231
DEHYDRATED PUMPKIN MIX
Frederic J. Kane, 1029 Ridge Ave.,
Philadelphia, Pa. 19123
No Drawing. Filed Jan. 2, 1968, Ser. No. 694,789
Int. Cl. A23g 3/00; A23l 1/14
U.S. Cl. 99—139                                       1 Claim

ABSTRACT OF THE DISCLOSURE

A dehydrated pumpkin mix comprising dehydrated pumpkin flour, dehydrated milk having a percentage by weight as compared to the weight of the pumpkin flour of approximately sixty-two percent, and dehydrated egg having a percentage by weight as compared to the weight of the pumpkin flour of approximately thirty-seven percent.

BACKGROUND OF THE INVENTION

This invention relates in general to the broad field of food preparation, and more partciularly is directed to a unique mixture of dry ingredients suitable for use in the commercial baking field to produce excellent pumpkin pies of uniformly high quality.

Previous workers in the art have produced pumpkin pies by utilizing either fresh pumpkin or canned pumpkin as the major ingredient. More recently, frozen pumpkin ingredients have become increasingly important in the industry. All previously known sources of pumpkin were common in that all of the natural moisture contents of the product were retained and were available to the baker.

Applicant, after due search of the technical literature and the records of the Patent Office and in view of his personal knowledge of the art based upon many years experience in the field of preparing and producing various mixes for distribution to commercial bakeries, has been unable to find any successful, prior, dry pumpkin mix.

It is felt that the formidable difficulties encountered when dehydrating the product and upon reconstitution of the dry ingredients has heretofore resulted in disappointing performance and unacceptable quality in the final product.

SUMMARY OF THE INVENTION

Pumpkin pies are unique and quite different from fruit pie fillings in that improper blends of ingredients will quite often result in cracking and pulling away from the crust following the usual baking period. This problem is common to all producers of pumpkin pies and has occurred regardless of whether canned, frozen or fresh pumpkin was employed. In the case of utilizing dehydrated pumpkin, the problem remains and is even more acute. Many tests and careful blending of the ingredients were required until the difficulty was completely overcome.

When experimenting to find a suitable mixture of dry ingredients, it was found that several of the dehydrated materials, such as eggs, milk, corn syrup and pumpkin each required different proportions of water and hydration. Great difficulties were experienced to find the optimum water level for reconstitution to satsify the requirements of each and all of the dehydrated materials.

Experimentation to find the optimum water level was rendered increasingly difficult due to the very nature of the dehydrated materials themselves. It was found that pumpkin pie is by nature related to a custard. Because of this, the dehydrated pumpkin and dehydrated whole eggs tended to combat each other in terms of taking on moisture. After many failures, it was determined to cease trying to utilize whole eggs entirely, and as a substitute, employ a blend of dehydrated egg abumen and dehydrated egg yoke. By carefully controlling the percentages of egg albumen to egg yoke, a whole egg total was found that will absorb the water without depriving the pumpkin solids of the necessary share of water for proper reconstitution.

It was found that if the constituents, particularly the dehydrated milk and egg powders, do not absorb the moisture properly, a serious stratification problem results. The evidence of such a problem occurs in the finished pumpkin pie, generally at the base where the filling meets the crust. This suspension problem, which is actually a lack of homogeneous mixture, produces a thin white line at the crust which may be as thick as one-quarter of an inch. After considerable effort, and upon many months of experimentation with different ingredients, it was found that the problem could be resolved by adding a derivative of algenic acid commonly referred to as an algin type gum and the correct percentage of milk and egg solids.

In the original mixtures, it was felt that the normal shred size of dehydrated pumpkin would be compatible with the rest of the ingredients. However, the original experiments produced a settling out and the pumpkin separated from the mass thereby making an unworkable mixture. Attempts were made to reduce the pumpkin shred size by grinding the material in conventional manner. This proved highly unsuccessful in that the heat generated by the friction of the grinding operations caused a congealing or lumping of the material and resulted in a completely unworkable ball-like mass. The problem caused considerable delay and required additional experimentation to find that by the addition of a starch carrier, heat could be absorbed, and the heat of friction could thus be overcome.

It was thus found that be carefully controlling the ingredients in the mix, by balancing the whole egg content, by incorporating ingredients not normally employed in dehydrated mixes and by properly proportioning the water for reconstitution purposes, a high quality, completely acceptable dehydrated pumpkin pie mix could be produced that completely eliminated the problems of cracking, cave-ins, pulling away from the crust and stratification that previously prevented other workers in the field from succeeding.

It is therefore an object of the present invention to produce a novel and improved pumpkin pie mix of the type set forth.

It is another object of the present invention to provide a novel pumpkin pie mix capable of producing perfect pies without cracking, caveins or pulling away from the crust.

It is another object of the instant invention to provide a novel pumpkin pie mix capable of producing perfect pies without stratification.

It is another object of the instant invention to provide a novel pumpkin pie mix capable of producing a high quality pie in each instance without failure or added cost.

It is another object of the instant invention to provide a novel pumpkin pie mix wherein all of the ingredients are dehydrated and wherein there are no cans to open or frozen ingredients to thaw.

It is another object of the instant invention to provide a complete mix requiring only the addition of measured quantities of water to positively eliminate all chance of error.

It is another object of the present invention to provide a dehydrated pumpkin mix that is inexpensive in manufacture, integrally complete in its constituents and completely trouble free when in use.

Other objects and a fuller understanding of the invention will be had by referring to the following description and claims of a preferred embodiment thereof.

DESCRIPTION OF THE PREFERRED EMBODIMENTS

Although specific terms are used in the following description for the sake of clarity, they are not intended to define or limit the scope of the invention.

In order to produce an acceptable dehydrated pumpkin mix, it was necessary to find the correct formula blend that can make it perform as desired. Experimentation proved that the flavoring ingredients did not affect the performance of the mixture to any significant extent and therefore, ingredients such as sugar, salt, spices and corn syrup solids could be employed and utilized as desired without adversely affecting the success of the mix. Other materials such as egg and milk solids were quite critical and percentages of these ingredients had to be quite carefully controlled.

It was also found that the consistency of the dehydrated pumpkin itself was important to the final success of the mix in that normally available shred size dehydrated pumpkin was found to be incompatible with the remainder of the materials and tended to settle out and separate from the mass. In order to overcome this problem, it was necessary to grind the dehydrated pumpkin to a finer consistency. The addition of 12½ pounds of starch per 100 pounds of dehydrated pumpkin proved to be the optimum mix in order to prevent congealing or lumping during the grinding process.

As has previously been set forth, it has been found necessary to utilize a blend of dehydrated egg albumen and egg yoke in lieu of dehydrated whole eggs in order to produce a whole egg total that will not combat the dehydrated pumpkin for the available water.

Initial tests were conducted employing percentages by weights of ingredients as follows:

| Ingredient: | Percent |
|---|---|
| Dehydrated pumpkin | 100 |
| Dehydrated milk | 31¼ |
| Dehydrated egg solids | 18¾ |
| Sugar | 150 |
| Corn syrup solids | 37½ |
| Starch | 12½ |
| Spice mixture | 3¼ |

These tests were based upon a combined percentage of milk and egg solids of 50% based on the pumpkin solids. Combinations of this order proved to be unworkable and in each instance resulted in a stratification problem with the undesirable results as previously set forth.

The next series of tests were conducted wherein the combined milk and egg solids were raised to 75% based on the dehydrated pumpkin, as follows:

| Ingredient: | Percent |
|---|---|
| Dehydrated pumpkin | 100 |
| Dehydrated milk | 47½ |
| Dehydrated egg solids | 27½ |
| Sugar | 150 |
| Corn syrup solids | 37½ |
| Starch | 12½ |
| Spice mixture | 3¼ |

The resultant mixtures proved to be more acceptable, but were still of inferior quality resulting in stratification and cracking. At this point, an algin type gum was introduced and was found to markedly improve the results. However, the final product was not perfect, but the tests indicated that proper steps were being taken.

Ultimately, the percentage of combined milk solids and egg solids was increased to 100% based on pumpkin solids, thereby resulting in perfect pie fillings on each occasion. The optimum mixture was found to be as follows:

| Ingredient: | Percent |
|---|---|
| Dehyrdated pumpkin | 100 |
| Dehydrated milk | 62½ |
| Dehydrated egg solids | 37½ |
| Sugar | 150 |
| Corn syrup solids | 37½ |
| Starch | 12½ |
| Spice mixture | 3½ |
| Algin type gum. | |

In view of the nature of the various dry and dehydrated materials in the mix, it required a series of etst to find the optimum levels to satisfy the requirements of each individual ingredient. The correct balance was found to be thirty-two ounces of hot tap water to each sixteen ounces of the combined powdered mix.

In order to use the instant dehydrated pumpkin pie mix, all that is required is to add two parts hot water to one part mix and allow to reconstitute for a period of forty-five minutes. Following the waiting period, the pie shells can then be filled and baked in accordance with usual practice.

What is claimed is:

1. In a dehydrated pumpkin mix, the combination of dehydrated pumpkin flour, dehydrated milk, dehydrated egg albumen, dehydrated egg yoke and a derivative of algenic acid, the weight of the milk having a percentage by weight as compared to the weight of the pumpkin flour of approximately sixty-two percent, and the combined weight of the egg albumen and egg yoke having a percentage by weight as compared to the weights of the pumpkin flour of approximately thirty-seven percent.

References Cited

UNITED STATES PATENTS

| | | | |
|---|---|---|---|
| 592,906 | 11/1897 | Gere | 99—204 |
| 617,423 | 1/1899 | McClatchey | 99—204 |
| 745,565 | 12/1903 | Brown | 99—204 |
| 2,992,113 | 8/1958 | Gorman | 99—94 |

OTHER REFERENCES

Kelco Algin, Oct. 5, 1961, pp. 1–7.

Food Engineering, May 1964, pp. 1 and 2, "Pure Pumpkin Powder."

Food Technology, October 1966, pp. 1 and 2, "Flavor and Storage Stability of Dehydrate Pumpkin."

NORMAN YUDKOFF, Primary Examiner

M. G. MULLEN, Assistant Examiner

U.S. Cl. X.R.

99—204, 200, 210